United States Patent [19]

von Bennigsen-Mackiewicz et al.

[11] Patent Number: 4,738,289
[45] Date of Patent: Apr. 19, 1988

[54] APPARATUS FOR WEIGHING GRANULAR OR PULVERULENT BULK GOODS

[76] Inventors: Andreas von Bennigsen-Mackiewicz; Christoph von Bennigsen-Mackiewicz, both of Muehlenstrasse 17, D-3211 Banteln, Fed. Rep. of Germany

[21] Appl. No.: 925,380

[22] Filed: Oct. 31, 1986

[30] Foreign Application Priority Data

Nov. 2, 1985 [DE] Fed. Rep. of Germany ....... 3538900

[51] Int. Cl.$^4$ ............................................. B65B 1/04
[52] U.S. Cl. ........................................ 141/67; 141/83; 406/3; 406/30; 414/304
[58] Field of Search ................... 141/18, 67, 68, 1–12, 141/83; 414/304; 406/3, 30

[56] References Cited

U.S. PATENT DOCUMENTS 4,545,410 10/1985 Paul et al. ............................. 141/67

Primary Examiner—Houston S. Bell, Jr.
Attorney, Agent, or Firm—Gilbert L. Wells

[57] ABSTRACT

An apparatus for weighing granular or pulverulent bulk goods, where the bulk good is moved by reduced pressure from a silo through at least one conveyance duct to a scale and where the flow of material is lowered by increasing the proportion of air toward the end of the conveyance procedure, is designed in such a manner as to make possible accurate and precise metering at high conveyance rates.

The invention includes a second conveyance duct not connected to the silo but leading to the scale to which the process switches over from the first conveyance duct toward the end of the weighing procedure, laminar air flow being sucked into the second conveyance duct, and a reservoir being provided which contains a slight quantity of the good to be moved and which is equipped at its lower region with a mechanical conveyor that is switched in by the scale toward the end of the conveyance procedure and that communicates with the end of the second conveyance line facing away from the scale and that furthermore uniformly supplies the good contained in the reservoir to the second conveyance duct.

21 Claims, 1 Drawing Sheet

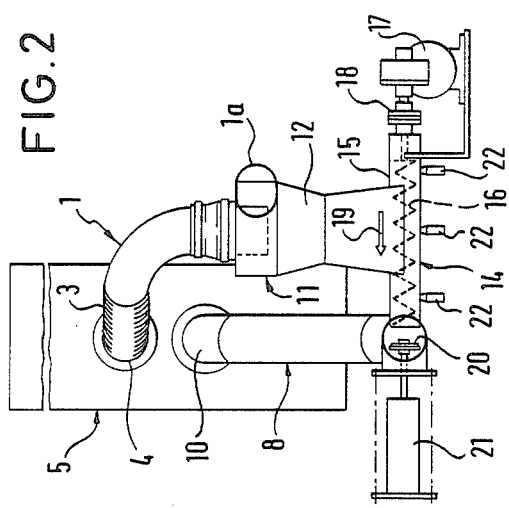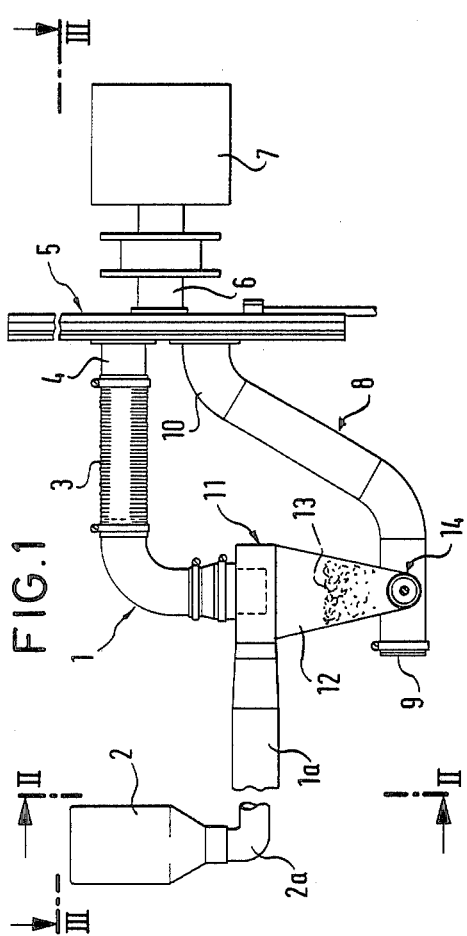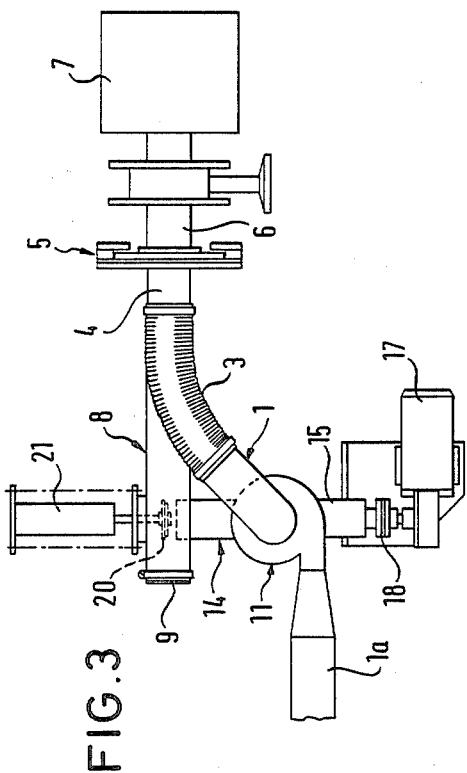

APPARATUS FOR WEIGHING GRANULAR OR PULVERULENT BULK GOODS

BACKGROUND OF THE INVENTION

The invention concerns apparatus for weighing granular or pulverulent bulk goods, wherein the bulk goods are moved by reduced pressure from a silo through at least one conveyance duct to a scale, the flow of material being lessened toward the end of the conveyance procedure by increasing the proportion of air in order to properly meter the process.

In known equipment of this kind, an air feeding branch line is connected to the conveyance duct with the shutoff valve of the branch line being opened near the end of the weighing procedure so that additional air enters the conveyance duct to lower the flow of material. In this manner the material conveyed per unt time is decreased and it is easier to carry out a metering process at the end of the weighing procedure.

This known equipment incurs the drawback that the uniformity of the flow of material is degraded by the supply of additional air, whereby the flow of material enters the scale with varying densities. The reduced-pressure conveyance furthermore may cause at least part of the material to accumulate in front of the branch pipe when the additional air is applied, whereby at times there is no conveyance of material at all.

SUMMARY OF THE INVENTION

Accordingly it is the object of the invention to so design apparatus of the initially cited kind as to make possible precise and accurate metering at high conveyance rates.

This problem is solved by the invention in that a second conveyance duct leading to the scale is provided, which does not communicate with the silo and to which the process switches over from the first conveyance line toward the end of the weighing procedure, a laminar air flow being sucked into the second conveyance duct and a reservoir being provided which contains a slight quantity of the conveyance goods and which furthermore is equipped at its lower region with a mechanical conveyor that can be turned on by the scale toward the end of the weighing procedure, this conveyor communicating with the end of the second conveyance duct away from the scale and uniformly feeding the goods contained in the reservoir into the second conveyance duct.

Such a design makes it possible first to move the goods at high conveying rates through the first conveyance duct (coarse flow duct) to the scale, whereupon the conveyance is switched over to the second conveyance duct (fine flow duct) and simultaneously the mechanical conveyor is activated and delivers small quantities of the goods into the laminar flow of the second conveyance duct. The result is uniform conveyance to the scale by a flow of material containing only a relatively low proportion of uniformly distributed material. Therefore it is now possible to achieve extremely fine and accurate metering of conveyed quantities of material at the end of the weighing procedure.

To implement the switch-over process, a switch device may be provided which is connected on one side to both conveyance ducts and on the other side to a duct leading to the scale. The switch device may consist of a pneumatically actuated slider or clack valves.

Various types of conveyors may be used as mechanical conveyors. Illustratively, the mechanical conveyor may be of the belt or chain type uniformly feeding the moved goods into the second conveyor duct. Again, the mechanical conveyor may be vibrating (vibrating chute), as thereby the material will be distributed especially uniformly on the conveyor.

A screw conveyor extending roughly horizontally will be an especially advantageous mechanical conveyor. Such a screw conveyor can be manufactured in especially easy and economical manner.

Appropriately all conveyors are mounted inside a tubular housing of which one end surface is connected to the second conveyance duct. It is especially advantageous in this respect to close the end surface facing the second conveyance duct by a valve head or the like. As a result, it will be possible to abruptly terminate the conveyance of material at the end of the weighing procedure.

To that end, an electropneumatic unit is appropriately used that will displace the valve head in the direction of the end surface of the housing containing the mechanical conveyor. The shutoff valve so formed also is controlled by the scale which may be electronic.

An especially appropriate embodiment consists of the reservoir being connected by its receiving end to the first conveyance duct (coarse flow duct). It is especially advantageous in this regard to insert a separator into the first conveyance duct which illustratively may be a cyclone, the reservoir being mounted below the separator. In this manner the reservoir is automatically filled during the main conveyance with the supply material to be moved, and any additional, manual filling of the reservoir is not needed.

This embodiment offers another advantage, namely that the reservoir reliably shall always hold the same bulk goods as the first conveyance duct.

Moreover, this design makes it possible to relatively easily empty the reservoir because, after the last weighing step, a pressure reduction takes place in the second conveyance duct whereupon the reservoir supplies material until completely empty.

To enhance material discharge by means of the mechanical conveyor, it may be appropriate to install nozzles in the conveyor housing which are pulsatingly loaded with compressed air. In this manner it is possible in particular to avert bridging in the reservoir, and furthermore care is taken thereby for an especially uniform inflow to the second conveyance duct.

The design of the invention furthermore makes it possible to connect several mechanical conveyors to the second conveyance duct, where each conveyor communicates with a reservoir and a separator and further with a separate coarse flow duct. This design allows to precisely meter directly sequential, diverse materials by means of the common second conveyance duct, provided that the conveyors which are out of use are closed in their housing by the shutoff valves in the manner described and that only the particular housing be open of which the material is to be fed into the second conveyance duct.

The components making up the coarse flow line segment, the reservoir, the mechanical conveyors, the conveyor housings and shutoff valves can always be integrated into one unit, where several such units may be joined in modular manner.

Apparatus of this type and consisting of several units also makes it possible to include the conveyance and weighing of specific mixtures of materials in its other functions.

BRIEF DESCRIPTION OF THE DRAWING

The invention is discussed below in further detail in relation to an illustrative embodiment shown in the drawing.

FIG. 1 is a schematic view of an embodiment mode of the apparatus of the invention.

FIG. 2 is the view II—II of FIG. 1.

FIG. 3 is the topview III—III of FIG. 1.

DESCRIPTION OF THE PREFERRED EMBODIMENTS

As shown in FIG. 1, a first conveyance duct 1 is provided which can be connected by a segment 1a to a duct 2a connected to the silo 2 shown schematically on a reduced scale. The end of the first conveyance duct 1 away from the silo 2 is connected by a flexible adapter 3 to a stub 4 of a switch device 5. On the other side of the switch device 5, a stub 6 leads—where called for through spacers or the like—into a schematically indicated and preferably electronic scale 7.

A second conveyance duct 8 furthermore is provided, into which air is sucked in laminar flow through a filter 9 or the like, with the end 10 away from the filter 9 of the second conveyance duct 8 also being connected to the switch device 5. This design therefore allows connecting optionally the conveyance duct 1 or the conveyance duct 8 to the scale 7.

The switch device 5 may be in the form of a pneumatically controlled slider, but also it may be in manner known per se a valve, for instance a clack valve.

The particular switchover shortly before the end of the weighing procedure to the second conveyance duct 8, or the resetting to the first conveyance duct 1 after completion of the weighing procedure, can be controlled by the scale 7.

As shown by FIG. 1, a separator 11 in the form of a cyclone is inserted into the first conveyance duct 1 (also see FIG. 3), a reservoir 12 being mounted below the separator 11 and containing a slight quantity of the material to be 13 moved which during the conveyance through the first conveyor duct 1 (coarse flow duct) deposits in the reservoir 12. The reservoir 12 communicates by means of a conveyor 14 mounted in its lower region with the free end of the second conveyance duct 8.

FIG. 2 is the elevation II—II of FIG. 1 and shows a screw conveyor 16 mounted in the housing 15 of the conveyor 14 and driven by a motor 17 (also see FIG. 3) through a clutch 18. Therefore the screw conveyor 16 moves the bulk goods collecting in the reservoir 12 in the direction of the arrow 19 into the second conveyance duct 8. The housing 15 of the conveyor 14 may be in the form of a pipe of which the end shown on the left in FIG. 2 can be sealed by a valve head 20 loaded by an electro-pneumatic unit 21.

FIG. 2 furthermore shows nozzles 22 inserted into the conveyor housing 15 which are loaded in pulsating manner with compressed air to prevent bridging in the reservoir 12 and to assure an especially uniform inflow into the second conveyance duct 8.

The described apparatus operates as follows:

At the beginning of the weighing procedure, the first conveyance duct 1, ie the coarse flow duct, is connected through the switch device 5 to the scale 7. During the conveyance process through the conveyor duct 1, a small amount of the material to be moved is separated by the separator 11 into the reservoir 12. Shortly before the end of the conveyance process, the scale 7 actuates the switch device 5, whereby the first conveyance duct 1 is shut down while the second conveyance duct 8, which also is at reduced pressure, is connected and initially sucks in air solely in laminar flow. Simultaneously with the switchover to the second conveyance duct 8, the mechanical conveyor 14 is set in motion to feed a small amount of the goods 13 contained in the reservoir 12 in the direction in FIG. 2 of the arrow 19 into the second conveyance duct 8. In this manner a laminar flow of material is produced in the second conveyance duct 8 which thereby acts as the fine flow duct, the supply of material being stoppable in precisely metered manner by controlling the unit 21. The accurate metering is provided by the low proportion of material in the flow of the fine flow duct 8. In this process the scale 7 controls the pneumatic unit 21 which closes when the scale 7 reaches the predetermined weight.

The uniformity of the material supply from the reservoir 12 to the second conveyance duct 8 is further improved by applying pulsating compressed air to the nozzles 22.

We claim:

1. In an apparatus for weighing granular or pulverulent bulk goods comprising a silo, a scale, at least a first conveyance duct connecting said silo and said scale for conveying said goods by means of reduced pressure and air entering said duct and means for decreasing the proportion of air at the end of a conveyance of goods to meter the flow of goods, the improvement comprising:

a second conveyance duct connected to said scale but not connected directly with said silo, means for switching over from said first conveyance duct at said end of said conveyance of goods, means for admitting laminar flow air into said second conveyance duct, a reservoir connected within said first conveyance adapted to contain a slight quantity of said goods being conveyed, said reservoir having at its lower region a meechanical conveyor actuatable by said scale at said end of said conveyance of goods, said mechanical conveyor connected with a first end of said second conveyance duct away from said scale, said mechanical conveyor uniformly feeding said slight quantity of goods contained in said reservoir into said second conveyance duct.

2. The apparatus of claim 1, wherein said means for switching comprises a switch device connected on one side to said first and second conveyance ducts and on the other side to a third duct leading to said scale.

3. The apparatus of claim 2, wherein said switch device (5) is a pneumatically driven slider.

4. The apparatus of claim 2, wherein said switch device consists of clack valves.

5. The apparatus of claim 1, wherein said mechanical conveyor is a belt.

6. The apparatus of claim 1, wherein said mechanical conveyor is a chain conveyor.

7. The apparatus of claim 1, wherein said mechanical conveyor is a vibrating conveyor.

8. The apparatus of claim 1, wherein said mechanical conveyor is an approximately horizontal screw conveyor.

9. The apparatus of claim 8, wherein said mechanical conveyor is mounted inside a tubular housing of which one end surface is connected to said conveyance duct.

10. The apparatus of claim 9, wherein said tubular housing has an end surface facing said second conveyance duct with a valve head adapted to seal said end surface.

11. The apparatus defined in claim 10, further comprising an electropneumatic unit for displacement of said valve head (20) toward said end surface.

12. The apparatus of claim 11, further comprising means for actuating said electropneumatic unit connected to said scale.

13. The apparatus of claim 1, wherein said scale is electronic.

14. The apparatus of claim 1, wherein said reservoir has a receiving end connected to said first conveyance duct.

15. The apparatus of claim 14, wherein a separator is inserted into said first conveyance duct.

16. The apparatus of claim 15, wherein said separator is a cyclone.

17. The apparatus of claim 16, wherein said reservoir is mounted underneath said separator.

18. The apparatus of claim 9, wherein said housing has nozzles fed with compressed air.

19. The apparatus of claim 18, wherein said nozzles are loaded in pulsating manner with compressed air.

20. The apparatus of claim 1, wherein second mechanical conveyors are connected to said second conveyance duct which communicate each with a reservoir, a separator and a separate coarse flow duct.

21. The apparatus of claim 15, wherein said coarse flow duct, reservoir, mechanical conveyor, conveyor housing and shutoff valve are assembled into one unit, said unit adapted to be joined in modular manner with other similar units.

* * * * *